United States Patent [19]
Degrange et al.

[11] Patent Number: 5,259,677
[45] Date of Patent: Nov. 9, 1993

[54] AXIALLY RESTRAINED AND BALANCED ECCENTRIC BEARING

[75] Inventors: David A. Degrange, Avon; Philip J. Draper, Wolcott; Steven C. Santelman, Northfield; Richard F. Murphy, Torrington, all of Conn.

[73] Assignee: The Torrington Company, Torrington, Conn.

[21] Appl. No.: 966,963

[22] Filed: Oct. 26, 1992

[51] Int. Cl.⁵ .................... F16C 19/26; F16C 43/04
[52] U.S. Cl. .................... 384/585; 384/255; 384/537; 384/560; 29/898.07
[58] Field of Search ............. 384/585, 255, 537, 560, 384/541; 29/898.07

[56] References Cited
U.S. PATENT DOCUMENTS

| | | |
|---|---|---|
| 1,498,170 | 6/1924 | Jimerson . |
| 1,605,986 | 11/1926 | Redfield . |
| 1,647,230 | 11/1927 | Jimerson . |
| 1,896,358 | 2/1933 | Gutman . |
| 4,450,797 | 5/1984 | Moser et al. .................... 384/255 |
| 5,011,306 | 4/1991 | Martinie .................... 384/585 |
| 5,184,402 | 2/1993 | Kadokawa .................... 29/898.07 |
| 5,199,171 | 4/1993 | Umezawa et al. .................... 29/898.07 |

Primary Examiner—Lenard A. Footland
Attorney, Agent, or Firm—John C. Bigler

[57] ABSTRACT

A bearing assembly is mounted on an eccentric sleeve having a bore for receiving a rotatable shaft. After the bearing assembly is mounted on the eccentric sleeve, a counterweight lobe is mounted on the eccentric sleeve, abutting the bearing assembly, to control dynamic balance of the bearing and sleeve assembly and to restrain movement of the bearing assembly along the axis of the bore. The eccentric sleeve and counterweight lobe are keyed together to prevent relative rotation therebetween.

14 Claims, 2 Drawing Sheets

AXIALLY RESTRAINED AND BALANCED ECCENTRIC BEARING

BACKGROUND OF THE INVENTION

This invention relates generally to needle roller bearings and, more particularly, to needle roller bearings used in the conversion of rotary motion into reciprocating linear motion.

It is not uncommon for bearings, especially needle roller bearings, to be used in the conversion of rotary motion, as might be created by a motor, into linear motion of another member, for example, a hydraulic piston actuating an anti-lock brake system. In such applications, the bearing provides a cam surface and the pistons serve as cam followers. To provide the required camming action, the bearings are mounted on either an eccentric shaft or an eccentric sleeve mounted on a cylindrical shaft.

In the case where the bearing is supplied on an eccentric sleeve which is made of powder metal, restraining the bearing to prevent axial play is a particularly difficult problem. Because of limited manufacturing tolerances of powder metal and stack-up of such tolerances, it is generally possible to mount the bearing onto the eccentric sleeve only by means of a slip-fit. The slip-fit is considerably "looser" than a press-fit and does not provide sufficient axial restraint of the bearing.

Apart from the problem of axially restraining a slip-fitted bearing, there is also a problem of rotational, or dynamic, balance when the bearing is slip-fitted onto an eccentric sleeve which is itself press-fitted onto a rotatable shaft. Unless the masses are properly balanced, rotation of the eccentrically mounted bearing will create a rotationally unbalanced load which may lead to premature failure of the bearing. Present bearing and eccentric sleeve combinations have been difficult to balance adequately.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an axially restrained and balanced bearing and sleeve assembly comprising an eccentric sleeve having a bore adapted to receive a rotatable shaft and a bearing assembly adapted to receive the eccentric sleeve. Abutment means is mountable on the eccentric sleeve after the bearing assembly has been mounted on the eccentric sleeve for abutting and restraining the bearing assembly. A counterweight means on at least one of the eccentric sleeve and abutment means provides dynamic balancing of the bearing and sleeve assembly when the shaft rotates.

The foregoing and other aspects of the invention will be apparent from the following detailed description of the invention when considered with the accompanying drawing figures.

BRIEF DESCRIPTION OF THE DRAWING FIGURES

In this specification, identical elements in different embodiments are given identical reference characters.

DETAILED DESCRIPTION

Figure 1:
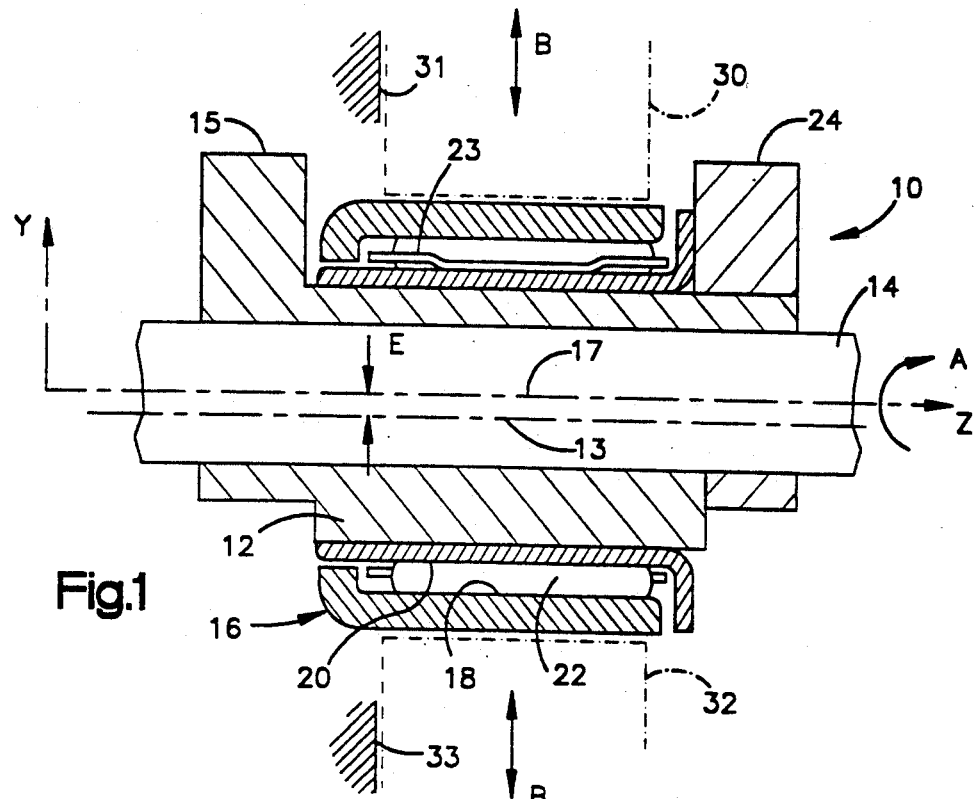
FIG. 1 is a cross sectional view illustrating an embodiment of axially restrained and balanced eccentric bearing of the present invention, with portions of reciprocating pistons of an hydraulic pump, for example, shown in phantom.

Referring now to the drawings, FIG. 1 illustrates an assembled bearing-sleeve structure 10, shown in cross section. Bearing-sleeve structure 10 is comprised of an eccentric sleeve 12 having a hollow bore adapted to receive a shaft 14 onto which eccentric sleeve 12 may be press-fitted. The hollow bore of eccentric sleeve 12 is offset with respect to the radially outward surface of eccentric sleeve 12, as described below.

Eccentric sleeve 12 is formed integrally with a first lobe 15 formed at one end of eccentric sleeve 12 which is radially offset with respect to eccentric sleeve 12 to abut and restrain axial movement of a needle roller bearing 16. Needle roller bearing 16 comprises an outer race 18, an inner race 20, and conventional needle rollers 22 aligned by a bearing retainer 23 between inner and outer races 18 and 20. The radially outward surface of eccentric sleeve 12 has a centerline 13 which is offset by an eccentricity "E" from centerline 17 of cylindrical shaft 14, as shown in FIG. 1.

In the assembled condition, a circular second lobe 24, similar in shape and function to circular first lobe 15, is mounted on eccentric sleeve 12 such that needle roller bearing 16 is abutted by and axially confined by the radially offset portions of first and second lobes 15 and 24 to provide a unitized assembly. Mounting of circular second lobe 24 may be by press-fit or other convenient means. Although first and second lobes 17 and 24 are circular, or disc shaped, in the preferred embodiment illustrated, other convenient shapes for lobes 15 and 24 could be employed in the present invention with similar effect.

In addition to serving as abutments to restrain needle roller bearing 16 along centerline 13, the radially offset portions of first and second lobes 15 and 24 function as balance weights. The masses and locations of first and second lobes 15 and 24 are preselected to balance eccentric sleeve 12 and needle roller bearing 16 and, in addition, to provide rotational, or dynamic, balance of assembled bearing-sleeve structure 10. In operation, cylindrical shaft 14 rotates in the direction of arrow "A" about the z-axis in an x-y-z coordinate system illustrated in FIG. 1. The z-axis coincides with centerline 17 of cylindrical shaft 14.

Figure 2:
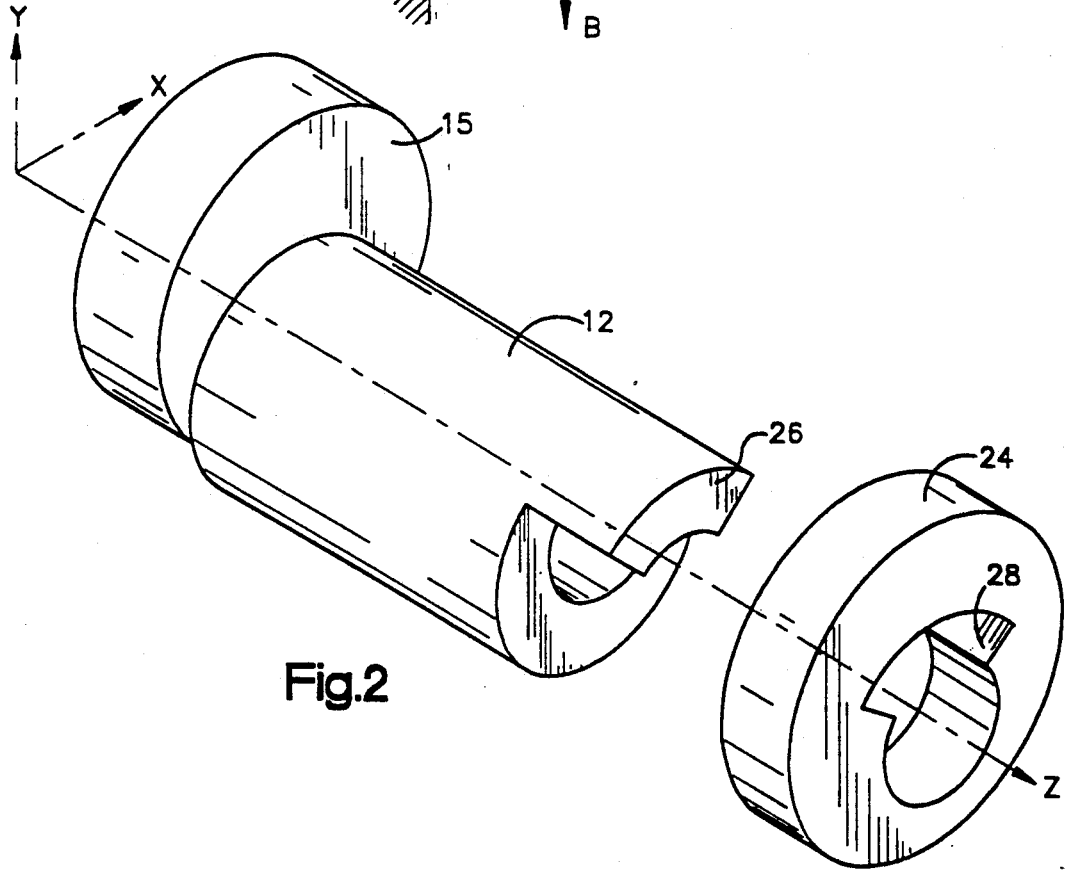
FIG. 2 is an exploded perspective view illustrating the eccentric sleeve, the bearing counterweight and the axial retention means of the embodiment of FIG. 1.

With reference to FIG. 2, rotational alignment between first lobe 15 of eccentric sleeve 12 and second lobe 24 is ensured by, for example, a projecting tab 26 of eccentric sleeve 12 designed to mate with a corresponding slot 28 of second lobe 24. The arrangement of respective masses of eccentric sleeve 12, first lobe 15, and second lobe 24 ensures dynamic balance of bearing-sleeve structure 10 in the x-y plane when the assembled structure (with needle roller bearing 16) rotates about the z-axis.

In the environment indicated in phantom in FIG. 1, assembled sleeve-bearing structure 10 is positioned such that hydraulic pistons 30 and 32 of a hydraulic pump, for example, serve as cam followers. Hydraulic pistons 30 and 32 move within respective guides (or bores) 31 and 33, respectively, indicated schematically, when shaft 14 rotates in the direction of arrow "A" around the z-axis. Hydraulic pistons 30 and 32 reciprocate with linear motion in the direction of arrows "B".

Figure 3:
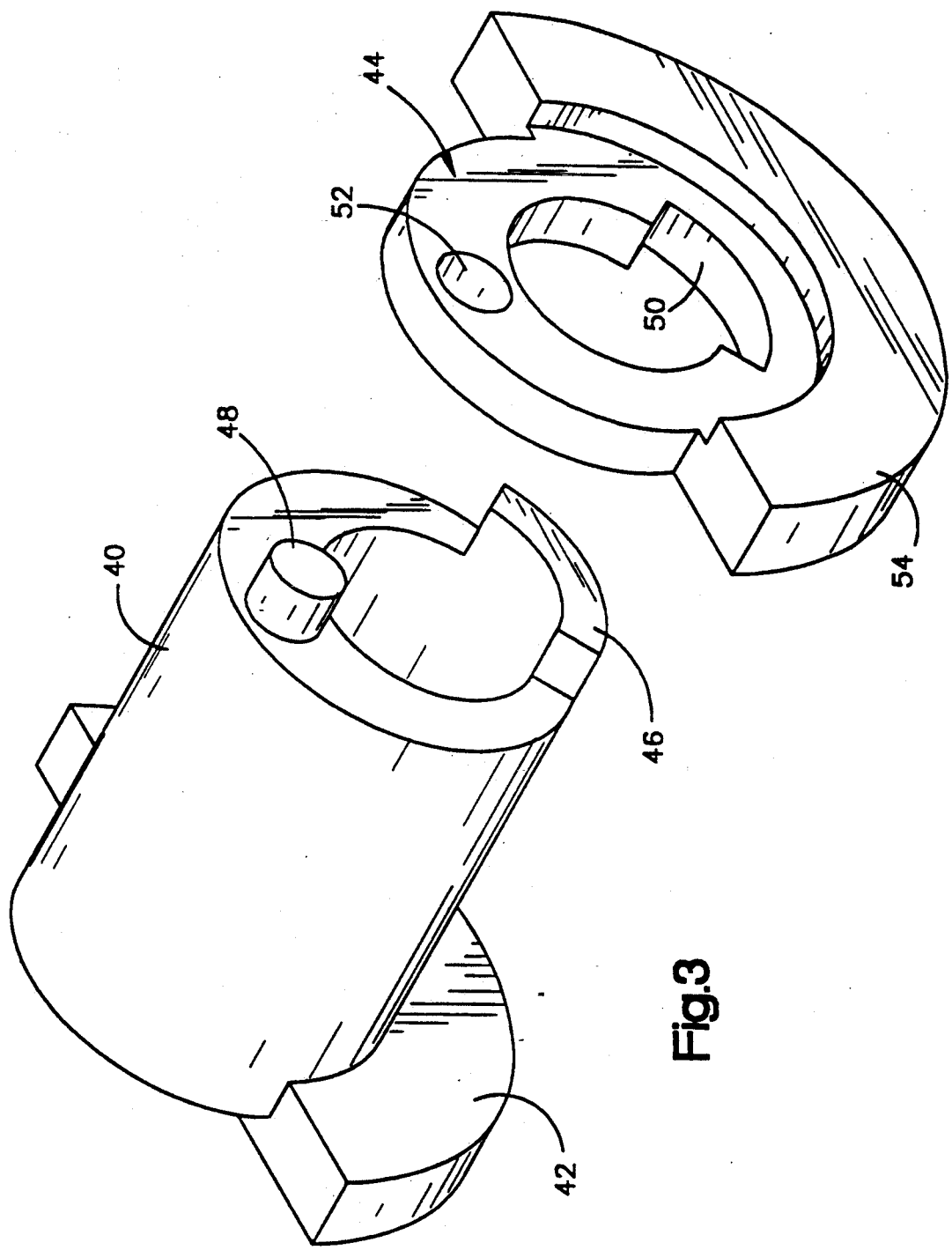
FIG. 3 illustrates an alternative embodiment of the bearing counterweight and axial retention means of the present invention, including additional keying means.

FIG. 3 illustrates an alternative embodiment of the present invention. Eccentric sleeve 40 is similar to eccentric sleeve 12 of FIGS. 1 and 2 in that eccentric sleeve 40 is formed integrally with a radially offset first lobe 42. First lobe 42 serves as a counterweight and abutment to restrain needle roller bearing 16, not shown, much as circular first lobe 15. However, first lobe 42 demonstrates that configurations other than an eccentric disc can be employed. For example, first lobe 42 is a crescent-shaped mass positioned diametrically opposite the thickest portion of eccentric sleeve 40.

A second lobe 44 is mounted on eccentric sleeve 40 axially opposite first lobe 42 by means of a tab 46, similar to tab 26, and a projecting pin 48. Tab 46 and projecting pin 48 mate with a corresponding slot 50 and aperture 52, respectively, in second lobe 44 to prevent rotation and axial movement of second lobe 44 with respect to eccentric sleeve 40. In the embodiment shown, the interlocking action of tab 46 and projecting pin 48 serves to lock second lobe 44 against a radially directed end surface of eccentric sleeve 40. Additional locking action may be provided by a press fit or by staking or flattening tab 46 and/or projecting pin 48, or other fastening means, after assembly.

Second lobe 44 has a crescent-shaped mass 54 similar to first lobe 42 positioned diametrically opposite the thickest portion of eccentric sleeve 40. First and second lobes 42 and 44 have a mass distribution such that any dynamic imbalance resulting from the rotating eccentric sleeve 40 and needle roller bearing 16 is offset and canceled by the counterweights of the crescent-shaped masses. The keying action of tab 46 and projecting pin 48 ensure that the balance relationship of the assembly will not be disturbed due to rotational movement between eccentric sleeve 40 and the counterweights of the crescent-shaped masses.

It should be noted that while first lobe 15 or 42 and second lobe 24 or 44 are shown as being symmetrical about a line parallel to the y-axis, such need not be the case. When the particular application requires, a non-symmetrical configuration of the lobes may be chosen. In any event, the configuration and materials of the lobes are selected such that the overall assembly, in cooperation with cam followers and other interacting devices, controls and maintains a predetermined rotational balance (or imbalance) in the x-y plane.

The present invention provides a convenient means of mounting an eccentric bearing on a concentric shaft such that axial play of the bearing is eliminated, and such that a desired dynamic balance or imbalance of the bearing and sleeve assembly is controlled and maintained. The sleeve and other components of the mounting means may be economically formed by powder metal forming or by other forming processes which result in limited dimensional precision. The invention is suitable for anti-lock brake systems and other applications requiring a cam surface.

Although the invention has been particularly shown and described with reference to preferred embodiments, it will be understood by those skilled in the art that the foregoing and other changes in form and details may be made therein without departing from the spirit and scope of the invention, as defined by the claims appended hereto. For example, a great variety of other key and keyway means may be used to ensure that, once second lobe 24 or 44 is mounted on eccentric sleeve 12 or 40, there is no possibility of relative rotation therebetween.

Having described the invention, what is claimed is:

1. An axially restrained and rotationally balanced bearing and sleeve assembly comprising:
   an eccentric sleeve having a bore adapted to receive a rotatable shaft;
   a bearing assembly having a bore adapted to receive the eccentric sleeve;
   abutment means mountable on the eccentric sleeve after the bearing assembly has been mounted on the eccentric sleeve for abutting and restraining the bearing assembly along the axis of the bearing assembly bore;
   counterweight means on at least one of the eccentric sleeve and abutment means for controlling the dynamic balance of the bearing and sleeve assembly when the shaft rotates; and
   key means for keying the eccentric sleeve and the abutment means to one another to prevent relative rotation therebetween.

2. The axially restrained and rotationally balanced bearing and sleeve assembly according to claim 1, wherein the bearing assembly comprises a needle roller bearing having needle rollers in an annulus between an inner race and an outer race.

3. The axially restrained and rotationally balanced bearing and sleeve assembly according to claim 1, wherein said key means comprises an arcuate tab on the sleeve cooperating with an arcuate slot in the abutment means.

4. The axially restrained and rotationally balanced bearing and sleeve assembly according to claim 1, wherein said key means comprises a projection on the eccentric sleeve cooperating with an aperture in the abutment means.

5. An axially restrained and rotationally balanced bearing and sleeve assembly comprising:
   a sleeve having a bore adapted to receive a rotatable shaft by press-fit, the sleeve having an eccentric distribution of mass around the axis of the bore;
   a bearing assembly having inner and outer races, the inner race having an internal diameter adapted to be slip-fitted onto the sleeve;
   a counterweight adapted to be press-fitted onto the sleeve after the bearing assembly has been slip-fitted onto the sleeve, the counterweight having a mass distribution so as to dynamically balance the bearing and sleeve assembly when the shaft rotates; and
   key means for keying the sleeve and the counterweight to one another to prevent relative rotation between the sleeve and the counterweight.

6. The axially restrained and rotationally balanced bearing and sleeve assembly according to claim 5, wherein the bearing assembly comprises a needle bearing.

7. The axially restrained and rotationally balanced bearing and sleeve assembly according to claim 5, wherein said key means comprises an arcuate tab on the sleeve cooperating with a arcuate slot in the counterweight.

8. The axially restrained and rotationally balanced bearing and sleeve assembly according to claim 5, wherein said key means comprises a projection on the sleeve cooperating with an aperture in the counterweight.

9. A method of balancing a bearing and sleeve assembly and for axially restraining the bearing on the sleeve, the method comprising:
   positioning a bearing assembly on an eccentric sleeve, the bearing assembly having a bore receiving the eccentric sleeve;
   mounting a counterweight on the eccentric sleeve after the bearing assembly has been positioned on the eccentric sleeve such that the bearing assembly is restrained along the axis of the bearing assembly bore and such that dynamic balance is controlled; and
   keying the counterweight to the eccentric sleeve to prevent relative rotation between the eccentric sleeve and the counterweight.

10. The method according to claim 9, wherein the keying step includes mating an arcuate tab on the eccentric sleeve with an arcuate slot formed in the counterweight.

11. The method according to claim 9, wherein the keying step includes mating a projection on the eccentric sleeve with an formed in the counterweight.

12. A method of balancing a bearing and eccentric sleeve assembly and for axially restraining the bearing on the eccentric sleeve, the method comprising:
   press-fitting the eccentric sleeve onto a rotatable shaft;
   slip-fitting a bearing assembly onto the eccentric sleeve;
   press-fitting a counterweight onto the sleeve after the bearing assembly has been slip-fitted onto the eccentric sleeve; and
   keying the counterweight to the eccentric sleeve to prevent relative rotation between the eccentric sleeve and the counterweight.

13. The method according to claim 12, wherein the keying step includes mating an arcuate tab on the sleeve with an arcuate slot formed in the counterweight.

14. The method according to claim 12, wherein the keying step includes mating a projection on the eccentric sleeve with an aperture in the counterweight.

* * * * *